(12) United States Patent
Hsu et al.

(10) Patent No.: US 7,146,544 B2
(45) Date of Patent: Dec. 5, 2006

(54) METHOD AND APPARATUS FOR SUPPORTING ERROR HANDLING IN A WEB PRESENTATION ARCHITECTURE

(75) Inventors: Christina Hsu, Mountain View, CA (US); Sankar Ram Sundaresan, San Jose, CA (US); Jeff A. Parks, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 558 days.

(21) Appl. No.: 10/676,218

(22) Filed: Oct. 1, 2003

(65) Prior Publication Data

US 2005/0076265 A1 Apr. 7, 2005

(51) Int. Cl.
*G06F 11/00* (2006.01)

(52) U.S. Cl. .................................................. 714/57
(58) Field of Classification Search ............... 714/57, 714/49, 50, 39, 47, 48
See application file for complete search history.

(56) References Cited

U.S. PATENT DOCUMENTS

| | | | |
|---|---|---|---|
| 6,018,343 A | 1/2000 | Wang et al. | |
| 6,134,680 A * | 10/2000 | Yeomans | 714/57 |
| 6,151,599 A | 11/2000 | Shrader et al. | |
| 6,278,456 B1 | 8/2001 | Wang et al. | |
| 6,332,161 B1 | 12/2001 | Sasson | |
| 6,345,292 B1 | 2/2002 | Daugherty et al. | |
| 6,380,959 B1 | 4/2002 | Wang et al. | |
| 6,397,245 B1 | 5/2002 | Johnson, II et al. | |
| 6,430,688 B1 | 8/2002 | Kohl et al. | |
| 6,505,343 B1 | 1/2003 | Menon et al. | |
| 6,517,587 B1 | 2/2003 | Satyavolu et al. | |
| 6,529,936 B1 | 3/2003 | Mayo et al. | |
| 6,536,037 B1 | 3/2003 | Guheen et al. | |
| 6,594,697 B1 * | 7/2003 | Praitis et al. | 709/225 |
| 6,606,708 B1 | 8/2003 | Devine et al. | |
| 6,915,454 B1 * | 7/2005 | Moore et al. | 714/38 |
| 2002/0056053 A1 * | 5/2002 | Vine et al. | 714/4 |
| 2002/0087915 A1 * | 7/2002 | Perla et al. | 714/15 |
| 2003/0145103 A1 * | 7/2003 | Pruyne et al. | 709/237 |
| 2003/0149919 A1 * | 8/2003 | Greenwald et al. | 714/43 |
| 2004/0078667 A1 * | 4/2004 | Salem | 714/26 |
| 2004/0153847 A1 * | 8/2004 | Apte et al. | 714/43 |

OTHER PUBLICATIONS

Sunny K. Yee et al., entitled Method and Apparatus for Supporting Object Caching in a Web Present Application, U.S. Appl. No. 10/652,388, patent application filed in the USPTO Aug. 29, 2003.
Brian James DeHamer et al., entitled Web Presentation Architecture that Supports Page Navigation Management, U.S. Appl. No. 10/652,988, patent application filed in the USPTO Aug. 29, 2003.
Brian James DeHamer et al., entitled Method and Apparatus for Supporting XML-Based Service Consumption in a Web Presentation Architecture, U.S. Appl. No. 10/652,469, patent application filed in the USPTO Aug. 29, 2003.

* cited by examiner

*Primary Examiner*—Nadeem Iqbal (57) ABSTRACT

A system and method for creating applications, such as web applications, is disclosed. The system may comprise a controller generator that is adapted to provide an application with a controller that receives a request for data from a user and responds to the request by sending information to the user. The system may also include an error handler generator that is adapted to provide an error handler that performs error handling functionality during operation of the application if an error occurs during the processing of the request for data based on error data that is stored in an error catalog.

25 Claims, 5 Drawing Sheets

METHOD AND APPARATUS FOR SUPPORTING ERROR HANDLING IN A WEB PRESENTATION ARCHITECTURE

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A user may initiate a web transaction with a web application by sending information to the web application via a browser or the like. A web transaction is everything that happens from when the web application receives the request until it returns a response to the user. The web application may access data resources or otherwise obtain information from a variety of sources in response to a user request.

Web applications are increasingly complex programs that, in some cases, process enormous amounts of information for hundreds or even thousands of users at a time. Error handling is an important aspect of making a user's transaction as trouble free as possible. Additionally, correct design of error handling aspects of a web application may minimize duplication of efforts by designers of web application.

Without correct error handling, web applications may be required to employ a different "action forward" for every type of exception. An "action forward" is a destination to which a controller servlet may be directed in response to a request. Such a system may easily become unmanageable based on the number of potential errors that may occur in web application processing. The use of a different "action forward" for each type of exception generated by a web application may greatly complicate the design of web applications.

BRIEF DESCRIPTION OF THE DRAWINGS

Advantages of one or more disclosed embodiments may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
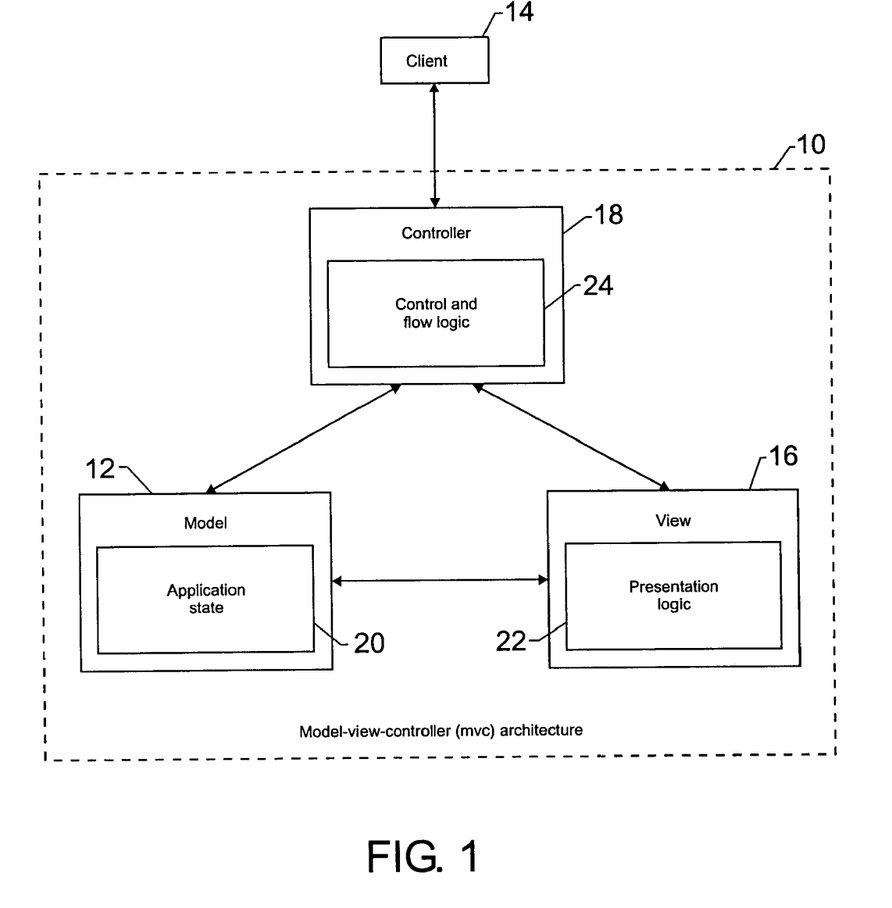
FIG. 1 is a block diagram that illustrates a model-view-controller ("MVC") application architecture, which may be created using embodiments of the present invention may be employed.

FIG. 1 is a block diagram that illustrates a model-view-controller ("MVC") application architecture, which may be created using embodiments of the present invention. As illustrated, the MVC architecture 10 separates the application object or model 12 from a view 16, which is responsible for receiving an input and presenting an output to a client 14. In a web application context, the client 14 may comprise a browser. The model object and the view are also separated from the control functions of the application, which are represented in FIG. 1 as a controller 18. In general, the model 12 comprises an application state 20, the view 16 comprises presentation logic 22, and the controller 18 comprises control and flow logic 24. By separating these three MVC objects 12, 16, and 18 with abstract boundaries, the MVC architecture 10 may provide flexibility, organization, performance, efficiency, and reuse of data, presentation styles, and logic.

The WPA 100 may be configured with a variety of object-oriented programming languages, such as Java by Sun Microsystems, Inc., Santa Clara, Calif. An object is generally any item that can be individually selected and manipulated. In object-oriented programming, an object may comprise a self-contained entity having data and procedures to manipulate the data. For example, a Java-based system may utilize a variety of JavaBeans, servlets, Java Server Pages ("JSPs"), and so forth. JavaBeans are independent, reusable software modules. In general, JavaBeans support introspection (a builder tool can analyze how a JavaBean works), customization (developers can customize the appearance and behavior of a JavaBean), events (JavaBeans can communicate), properties (developers can customize and program with JavaBeans), and persistence (customized JavaBeans can be stored and reused). JSPs provide dynamic scripting capabilities that work in tandem with hypertext markup language ("HTML") code, separating the page logic from the static elements. According to certain embodiments, the WPA 100 may be designed according to the Java 2 Platform Enterprise Edition (J2EE), which is a platform-independent, Java-centric environment for developing, building and deploying multi-tiered Web-based enterprise applications online.

The model 12 comprises a definitional framework representing the application state 20. For example, in a web-based application, the model 12 may comprise a JavaBean object or other suitable means for representing the application state 20. Regardless of the application or type of object, an exemplary model 12 may comprise specific data and expertise or ability (methods) to get and set the data (by the caller). The model 12 generally focuses on the intrinsic nature of the data and expertise, rather than the extrinsic views and extrinsic actions or business logic to manipulate the data. However, depending on the particular application, the model 12 may or may not contain the business logic along with the application state. For example, a large application having an application tier may place the business logic in the application tier rather than the model objects 12 of the web application, while a small application may simply place the business logic in the model objects 12 of the web application.

As noted above, the view and controller objects 16 and 18 separately address these extrinsic views and actions or business logic. For example, the model 12 may represent data relating to a person (e.g., an address, a birth date, phone number, etc.), yet the model 12 is independent of extrinsic formats (e.g., a date format) for displaying the personal data or extrinsic actions for manipulating the personal data (e.g., changing the address or phone number). Similarly, the model 12 may represent data and expertise to track time (e.g., a clock), yet the model 12 is independent of specific formats for viewing the clock (e.g., analog or digital clock) or specific actions for manipulating the clock (e.g., setting a different time zone). These extrinsic formats and extrinsic actions are simply not relevant to the intrinsic behavior of the model clock object. One slight exception relates to graphical model objects, which inherently represent visually perceptible data. If the model 12 represents a particular graphical object, then the model 12 has expertise to draw itself while remaining independent of extrinsic formats for displaying the graphical object or extrinsic actions for creating or manipulating the graphical object.

The view 16 generally manages the visually perceptible properties and display of data, which may be static or dynamic data derived in whole or in part from one or more model objects 12. As noted above, the presentation logic 22 functions to obtain data from the model 12, format the data for the particular application, and display the formatted data to the client 14. For example, in a web-based application, the view 16 may comprise a Java Server Page (JSP page) or an HTML page having presentation logic 22 to obtain, organize, format, and display static and/or dynamic data. Standard or custom action tags (e.g., jsp:useJavaBean) may function to retrieve data dynamically from one or more model objects 12 and insert model data within the JSP pages. In this manner, the MVC architecture 10 may facilitate multiple different views 16 of the same data and/or different combinations of data stored by one or more model objects 12.

The controller 18 functions as an intermediary between the client 14 and the model object 12 and view 16 of the application. For example, the controller 18 can manage access by the view 16 to the model 12 and, also, manage notifications and changes of data among objects of the view 16 and objects of the model 12. The control and flow logic 24 of the controller 18 also may be subdivided into model-controllers and view-controllers to address and respond to various control issues of the model 12 and the view 16, respectively. Accordingly, the model-controllers manage the models 12 and communicate with view-controllers, while the view-controllers manage the views 16 and communicate with the model-controllers. Subdivided or not, the controllers 18 ensure communication and consistency between the model 12 and view 16 and the client 14.

In operation, the control and flow logic 24 of the controller 18 generally receives requests from the client 14, interprets the client requests, identifies the appropriate logic function or action for the client requests, and delegates responsibility of the logic function or action. Requests may be received from the client via a number of protocols, such as Hyper Text Transfer Protocol ("HTTP") or HTTP with Secure Sockets Layer ("HTTPS"). Depending on the particular scenario, the appropriate logic function or action of the controller 18 may include direct or indirect interaction with the view 16 and/or one or more model objects 12. For example, if the appropriate action involves alteration of extrinsic properties of data (e.g. reformatting data in the view 16), then the controller 18 may directly interact with the view 16 without the model 12. Alternatively, if the appropriate action involves alteration of intrinsic properties of data (e.g., values of data in the model 12), then the controller 18 may act to update the corresponding data in the model 12 and display the data in the view 16.

Figure 2:
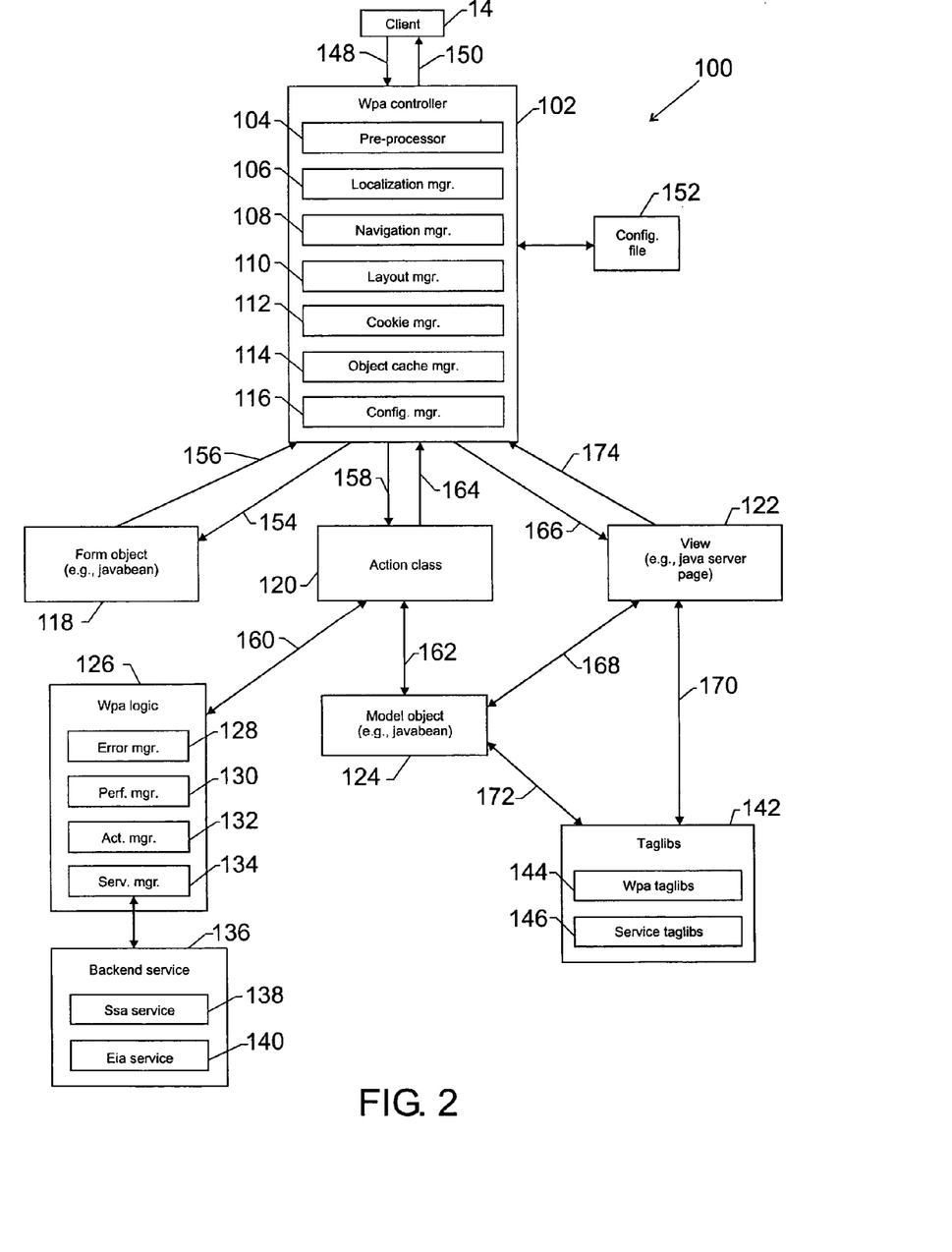
FIG. 2 is a block diagram that illustrates a web presentation architecture in accordance with embodiments of the present invention.

FIG. 2 is a block diagram illustrating an exemplary web presentation architecture ("WPA") 100 in accordance with certain embodiments of the present invention. The illustrated WPA 100, which may be adapted to execute on a processor-based device such as a computer system or the like, has certain core features of the MVC computing strategy, and various additional features and enhancements to improve its architectural operation and performance. For example, the illustrated WPA 100 separates the model, the view, and the controller as with the traditional MVC architecture, yet the WPA 100 provides additional functionality to promote modularity, flexibility, and efficiency.

As illustrated, the WPA 100 comprises a WPA controller 102 having a preprocessor 104, a localization manager 106, the navigation manager 108, a layout manager 110, a cookie manager 112, and object cache manager 114, and a configuration manager 116. The WPA controller 102 functions as an intermediary between the client 14, form objects 118, action classes 120, and views 122. In turn, the action classes 120 act as intermediaries for creating/manipulating model objects 124 and executing WPA logic 126, such as an error manager 128, a performance manager 130, and activity manager 132, and a backend service manager 134. As described below, the backend service manager 134 functions to interface backend services 136. Once created, the model objects 124 can supply data to the view 122, which can also call various tag libraries 142 such as WPA tag libraries 144 and service tag libraries 146.

In operation, the client 14 sends a request 148 to the WPA 100 for processing and transmission of a suitable response 150 back to the client 14. For example, the request 148 may comprise a data query, data entry, data modification, page navigation, or any other desired transaction. As illustrated, the WPA 100 intakes the request 148 at the WPA controller 102, which is responsible for various control and flow logic among the various model-view-controller divisions of the WPA 100. For example, the WPA controller 102 can be implemented as a Servlet, such as a HyperText Transfer Protocol ("HTTP") Servlet, which extends the ActionServlet class of Struts (an application framework promulgated by the Jakarta Project of the Apache Software Foundation). As illustrated, the WPA controller 102 invokes a configuration resource file 152, which provides mapping information for form classes, action classes, and other objects. Based on the particular request 148, the WPA controller 102 locates the appropriate action class and, also, the appropriate form class if the request 148 contains form data (e.g., client data input). For example, the WPA controller 102 may lookup a desired WPA Action Form and/or WPA Action Class, which function as interfaces to WPA Form Objects and WPA Action Objects.

If the client entered data, then the WPA controller 102 creates and populates the appropriate form object 118 as indicated by arrow 154. The form object 118 may comprise any suitable data objects type, such as a JavaBean, which functions to store the client entered data transmitted via the request 148. The WPA controller 102 then regains control as indicated by arrow 156.

If the client did not enter data, or upon creation and population of the appropriate form object 118, then the WPA controller 102 invokes the action class 120 to execute various logic suitable to the request 148 as indicated by arrow 158. For example, the action class 120 may call and execute various business logic or WPA logic 126, as indicated by arrow 160 and discussed in further detail below. The action class 120 then creates or interacts with the model object 124 as indicated by arrow 162. The model object 124 may comprise any suitable data object type, such as a JavaBean, which functions to maintain the application state of certain data. One example of the model object 124 is a shopping cart JavaBean, which stores various user data and e-commerce items selected by the client. However, a wide variety of model objects 124 are within the scope of the WPA 100. After executing the desired logic, the action class 120 forwards control back to the WPA controller 102 as indicated by arrow 164, which may be referred to as an "action forward." This action forward 164 generally involves transmitting the path or location of the server-side page, e.g., the JSP.

As indicated by arrow 166, the WPA controller 12 then invokes the foregoing server-side page as the view 122. Accordingly, the view 122 interprets its links or tags to retrieve data from the model object 124 as indicated by arrow 168. Although a single model object 124 is illustrated, the view 122 may retrieve data from a wide variety of model objects. In addition, the view 122 interprets any special logic links or tags to invoke tag libraries 142 as indicated by arrow 170. For example, the WPA tag libraries 144 and the service tag libraries 146 can include various custom or standard logic tag libraries, such as <html>, <logic>, <template> developed as part of the Apache Jakarta Project or the like. Accordingly, the tag libraries 142 further separate the logic from the content of the view 122, thereby facilitating flexibility and modularity. In certain cases, the tag libraries 142 also may interact with the model object 124 as indicated by arrow 172. For example, a special tag may execute logic to retrieve data from the model object 124 and manipulate the retrieved data for use by the view 122. After interacting with the model object 124 and the appropriate tag libraries 142, the WPA 100 executes the view 122 (e.g., JSP) to create a client-side page for the client 14 as indicated by arrow 174. For example, the client-side page may comprise an extended markup language ("XML") or HTML formatted page, which the WPA controller 102 returns to the client 14 via the response 150.

As discussed above, the WPA 100 comprises a variety of unique logic and functional components, such as control components 104 through 116 and logic 128 through 134, to enhance the performance of the overall architecture and specific features 100. These components and logic generally operate on the server-side of the WPA 100, yet there are certain performance improvements that may be apparent on the client-side. These various components, while illustrated as subcomponents of the controller 102 or types of logic 126, may be standalone or integrated with various other portions of the WPA 100. Accordingly, the illustrated organization of these components is simply one exemplary embodiment of the WPA 100, while other organizational embodiments are within the scope of the present technique.

Turning to the subcomponents of the WPA controller 102, the preprocessor 104 provides preprocessing of requests by configuring portal specific functions to execute for each incoming request registered to the specific portal. The preprocessor 104 identifies the appropriate portal specific functions according to a preset mapping, e.g., a portal-to-function mapping in the configuration file 152. Upon completion, the preprocessor 104 can redirect to a remote Uniform Resource Identifier (URI), forward to a local URI, or return and continue with the normal processing of the request 148 by the WPA controller 102. One example of such a preprocessing function is a locale, which is generally comprised of language preferences, location, and so forth. The preprocessor 104 can preprocess local logic corresponding to a particular portal, thereby presetting language preferences for subsequent pages in a particular application.

The locale information is also used by the localization manager 106, which functions to render localized versions of entire static pages rather than breaking up the static page into many message strings or keys. Instead of using a single page for all languages and obtaining localized strings from other sources at run time, the localization manager 106 looks up a localized page according to a locale identifier according to a preset mapping, e.g., a locale-to-localized page mapping in the configuration file 152. For example, the capability to render static localized pages in the localization manager 106 is particularly useful for static information, such as voluminous help pages.

The navigation manager 108 generally functions to save a users intended destination and subsequently recall that information to redirect the user back to the intended destination. For example, if the user intends to navigate from point A to point B and point B queries for certain logic at point C (e.g., a user login and password), then the navigation manager 108 saves the address of point B, proceeds to the requested logic at point C, and subsequently redirects the user back to point B.

The layout manager 110 enables a portal to separate the context logic functioning to render the common context from the content logic functioning to render the content portion of the page. The common context (e.g., C-Frame) may include a header, a bottom portion or footer, and a side portion or side bar, which collectively provides the common look and feel and navigational context of the page.

The cookie manager 112 functions to handle multiple cookie requests and to set the cookie value based on the most recent cookie request before committing a response. For example, in scenarios where multiple action classes attempt to set a particular cookie value, the cookie manager 112 caches the various cookie requests and defers setting the cookie value until response time. In this manner, the cookie manager 112 ensures that different action classes do not erase cookie values set by one another and, also, that only one cookie can exist with a particular name, domain, and path.

The object cache manager 114 enables applications to create customized in-memory cache for storing objects having data originating from backend data stores, such as databases or service based frameworks (e.g., Web Services Description Language "WSDL"). The in-memory cache may be customized according to a variety of criteria, such as cache size, cache scope, cache replacement policy, and time to expire cache objects. In operation, the object cache manager 114 improves performance by reducing processing time associated with the data from the backend data stores. Instead of retrieving the data from the backend data stores for each individual request 148, the object cache manager 114 caches the retrieved data for subsequent use in processing later requests.

The configuration manager 116 functions to oversee the loading of frequently used information, such as an error code table, into memory at startup time of a particular web application. The configuration manager 116 may retain this information in memory for the duration of an application server session, thereby improving performance by eliminating the need to load the information each time the server receives a request.

Turning to the WPA logic 126, the error handler or manager 128 functions to track or chain errors occurring in series, catalog error messages based on error codes, and display error messages using an error catalog. The error catalog of the error manager 128 may enable the use of generic error pages, which the error manager 128 populates with the appropriate error message at run time according to the error catalog.

The WPA logic function 126 may comprise performance and activity managers 130 and 132, which may facilitate tracking and logging of information associated with a particular transaction or request. The error manager 128 may also be adapted to participate in tracking and logging operations as well.

The service manager 134 of the WPA logic 126 functions as an interface between the WPA 100 and various backend services 136. In operation, the service manager 134 communicates with the desired backend service 136 according to the client request 148, parses a response from the backend service 136 to obtain the appropriate data, and pass it to the appropriate object of WPA 100.

The following discussion relates to the implementation of error handling capability in a web presentation architecture. To simplify error handling, errors may be categorized into three major types of exceptions. This categorization may simplify the forwarding to error pages or pages that should be displayed in the event of an error. The use of an error code catalog optimizes the error JSP pages, as well, by determining the message at runtime and reducing the number of JSP pages needed. Finally, exception chaining functionality allows the documentation of exceptions, which allows application developers to improve the operation of web applications. The general functionality of a web application constructed in accordance with embodiments of the present invention is described below with reference to FIG. 3.

Figure 3:
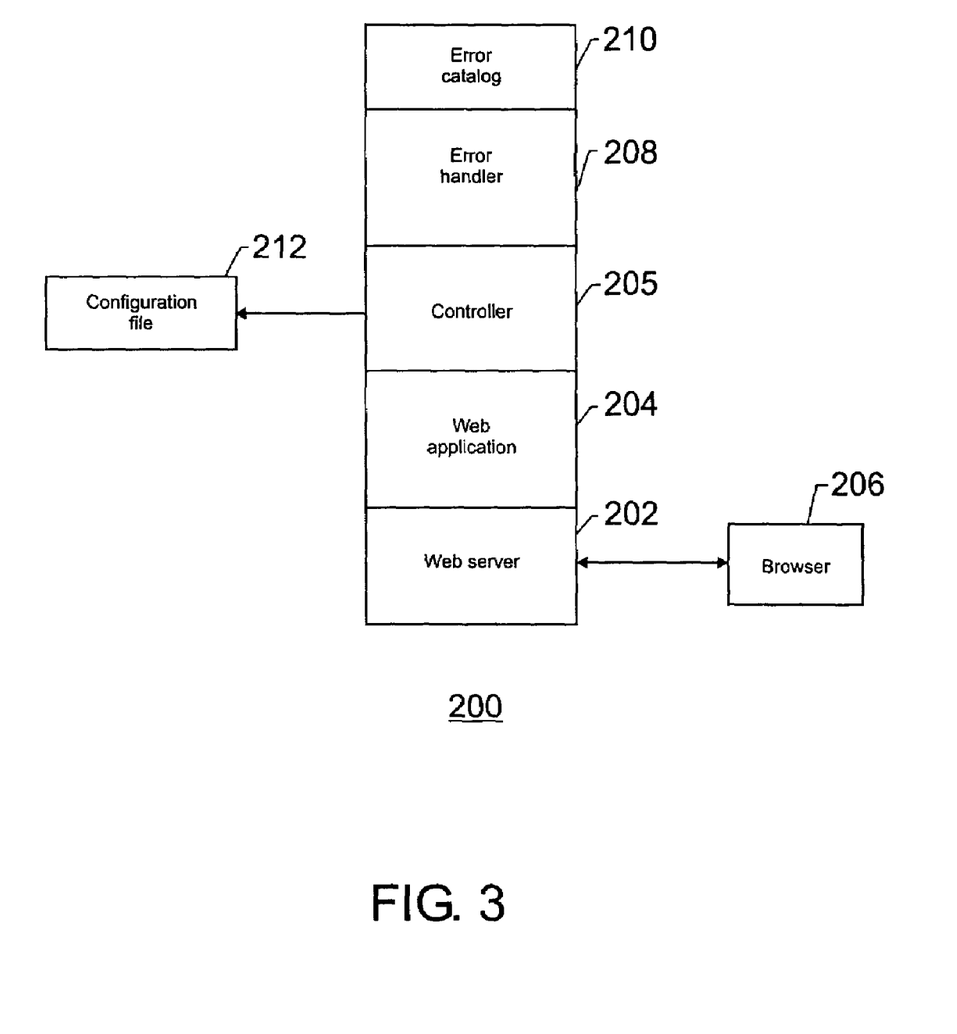
FIG. 3 is a block diagram that illustrates the operation of error handling functionality in a web application program created using a web presentation architecture in accordance with embodiments of the present invention.

FIG. 3 is a block diagram that illustrates the operation of error handling functionality in a web application program created using a web presentation architecture in accordance with embodiments of the present invention. The diagram is generally referred to by the reference numeral 200. A web server 202 hosts a web application 204, which is constructed according to a web processing architecture according to embodiments of the present invention. A user may access the web application 204 by using a browser 206 or the like. The web application 204 embodies a controller 205 and an error handler 208, the operation of which is described in detail below. The error handler 208 may interface with an error catalog 210, which may contain information relating to various types of errors that may occur during the operation of the web application 204. Upon initialization, the controller 205 may load error information from a configuration file or files 212 and make that information available for later use by storing it in the error catalog 210. Those of ordinary skill in the art will appreciate that the controller 205, the error handler 208 and the error catalog 210 may comprise separate operating modules or may be incorporated into the web application 204.

The error handler 208 may comprise: 1) the ability to handle exceptions with a unique constructor-driven chaining mechanism, and 2) an interface for directing the flow of an HTTP request in the event of an exception. These elements may operate in conjunction with the error catalog 210 to allow the web application 204 to determine what type of error message to display.

In web presentation architectures constructed in accordance with embodiments of the present invention, defined exceptions may share a common base class. This class may be referred to as the WPAException class. The key feature of a WPAException is the ability to chain. Specifically, if a caught exception causes a different exception to be created and thrown, the original exception is not lost. Instead, the original exception may be established as the "root exception" of the new exception. The root exception may be passed in as a parameter to the constructor of the new exception. The concept of chaining may be valuable in error tracking.

The interface for directing the flow of an HTTP request in the event of an exception is based on the categories of exceptions. There may be three separate abstract subclasses of WPAException that all exceptions must extend. In this way, exceptions may be easily classified. Depending on which subclass of WPAException a specific exception falls into, one of two action forwards may be called, with the exception or an error code passed to it. In one case, the request may result in a standard error page being delivered, and in the other, the action forward may use a key provided to its constructor to determine the page to display. By utilizing the inheritance hierarchy defined by WPAException classes, the interface for displaying a page to the user when an error has occurred may be easily implemented. The type of message displayed to the user may depend on the type of exception or the action forward that is called. In those cases, the message displayed may be determined using the error catalog 210, as described below.

Exceptions may have associated error data, which may include error codes, stored in the error catalog 210. Some categories of exceptions may not need error data stored in the error catalog 210. For example, exceptions that are concrete subclasses (i.e. a subclass that may have instances or be instantiated rather than inherited) of BusinessException do not need error data in the error catalog, while exceptions that are concrete subclasses of SystemException and FrameworkException do need their error data stored. The error catalog 210 may be loaded based on information in a configuration file or files 212. Among that information are keys used for message display in an error page. When an exception occurs and an action forward is called, the error catalog 210 may be accessed based on the error code and used to determine which error message to display in the resulting page. In some cases, the error code catalog 210 may also be accessed based on the type of error action forward and used to determine the error message to display in the resulting page. With the error code catalog 210, error JSP pages may remain generic. The error message may be determined at runtime and, therefore, may be plugged into the framework of a JSP.

The following discussion relates to the structuring of exceptions and how an error page may be displayed to the user when exceptions occur. As set forth above, an abstract superclass may be defined for all exceptions. For purposes of illustration, that class is referred to herein as the WPAException class. Two abstract subclasses may be the FeatureException subclass and the FrameworkException subclass. The FeatureException subclass may be used as the superclass for all exceptions thrown by services. The FrameworkException subclass may be used as the superclass for all exceptions thrown within the framework of a web presentation architecture constructed in accordance with embodiments of the present invention.

FeatureException may be further defined to include two abstract subclasses: BusinessException and SystemException. Any exceptions defined by services must be a subclass of either BusinessException or SystemException. This is significant in that these distinctions may be used to determine whether an exception is logged.

Information regarding each concrete subclass of SystemException and FrameworkException may be stored in the error catalog 210. Each service that defines concrete subclasses of SystemException must have an errorCode.properties file (such as the configuration file 212) in a specified directory that contains information on each concrete subclass of SystemException that the service has created. Concrete subclasses of FrameworkException must also have data recorded in an errorCode.properties file, but because those exceptions have been created within the framework of a web presentation architecture constructed in accordance with embodiments of the present invention, they reside in the framework's errorCode.properties file. During the initialization of the controller 305, the errorCode.properties file for each service and the framework may be read, and stored into the error catalog 210, which may be searchable by error code. When an exception is created, WPAException may use the error catalog 210 to find information about the error that will be used during logging.

When a service needs to forward the user to another page that results from a caught exception, a concrete instance of a WPAErrorActionForward subclass (WPASystemErrorActionForward or WPABusinessErrorActionForward) must be created to forward the proper page. Storing data to be logged in business activity and error log files may be automatically handled when these action forwards are created.

If exceptions occur outside of the context of the web application 204 (for example, when action classes interact with other architectures), those exceptions do not have to have to be redefined as WPAExceptions. Outside exceptions need not be logged in error logs. Instead, those exceptions may be logged as part of the transaction tracking and logging functionality of a web application as the reason for the failed transaction.

Web presentation architectures in accordance with embodiments of the present invention may provide a way to handle and log external exceptions that are returned as a result to an action class. For example, if a web application is interacting with a service architecture, services may either directly use the action class associated with the service architecture (i.e. map the URI to the service architecture action class), or wrap the service architecture action class inside their own action class. The service architecture action class may automatically create and convert the result to any needed web presentation architecture artifacts (for example, WPASystemErrorActionForward). Therefore, if a service directly uses the service architecture action class, all error forwarding may be performed automatically. In that case, services need not take any extra steps for error logging.

However, if the service wraps the service architecture action class and catches an exception before or after the service action instance processes the service request, the action class of the service may be responsible for creating its own WPABusinessErrorActionForward or WPASystemErrorActionForward. If the action class of the service wraps any action class inside it, it may be responsible for ensuring that logging for any exceptions that occurred in those wrapped action classes takes place. Because the wrapped action class may create its own WPAErrorActionForward, logging of exceptions within the wrapped action class may be performed automatically. For any wrapped action class that does not return a WPAErrorActionForward, the service must directly log any exceptions.

For concrete subclasses of SystemException and FrameworkException, an error page containing a configurable title and user interface ("UI") message may be displayed. The error page also indicates the error code below the UI message. The title and the UI message keys must be defined in the configuration file or files 212 according to numerical error code range or according to type of action forward. These keys map to messages stored in a configuration file in a specific predetermined directory.

For concrete subclasses of BusinessException, the WPABusinessErrorActionForward constructor may comprise an extra parameter, a key that contains the action forward name of the page to be displayed. The pathname mappings may be stored in a separate configuration file such as configuration resource file 152 (FIG. 2). The error code may be stored in request scope in case the page to be displayed needs access to that data. A request scope object is available during the entirety of a request cycle. Both WPASystemErrorActionForward and WPABusinessErrorActionForward may forward to a default error page unless an alternate mapping is defined. In the case of concrete subclasses of BusinessException, the default error page may be like the error page described above for concrete subclasses of SystemException and FrameworkException.

The error handler 208 may comprise a plurality of classes, which may be referred to as "actors." Those actors may include the following:

Service's action class—the action class to which a service should throw an exception if it wants an error page to be displayed.

WPAErrorActionForward—the abstract superclass of WPASystemErrorActionForward and WPABusinessErrorActionForward.

WPASystemErrorActionForward—what an action class should return in its perform( ) method if it catches an exception that is an instance of a concrete subclass of SystemException or a FrameworkException.

WPABusinessErrorActionForward—what a service's action class should return in its perform( ) method if it catches an exception that is an instance of a concrete subclass of BusinessException.

ErrorInfoBean—used by WPAErrorActionForward to store the exception's information so it can be accessed by the error jsp page.

WPAException—the abstract superclass of all WPA exceptions.

FeatureException—the abstract superclass of all service exceptions. It is a subclass of WPAException.

FrameworkException—the abstract superclass of all WPA framework exceptions. It is a subclass of WPAException.

BusinessException—an abstract subclass of FeatureException. All service business exceptions should subclass BusinessException.

SystemException—an abstract subclass of SystemException. All service system exceptions should subclass SystemException.

Service's own exceptions—concrete subclasses of either BusinessException or SystemException, needed for logging and error handling.

Programmer—the actor who defines new exceptions and uses those exceptions in code.

The following use case describes a typical course of events for a situation in which a service throws an exception, but catches the exception and resolves it without displaying an error message to the user:
1. Service's action class is called, and code is executed in the perform( ) method.
2. Exception is thrown somewhere within the service's code, but it is something the service can resolve and does not require an error page to be displayed to the user.
3. Service code catches the exception and deals with it accordingly. The exception should have been pre-defined to subclass the correct WPAException class.

The following use case describes a typical course of events for a situation in which a service needs to display a business error page as a result of a caught exception:
1. Service's action class is called, and code is executed in the perform( ) method.
2. Exception is thrown somewhere within the service's code, but it is something the service code cannot resolve on its own, therefore an error page must be displayed to the user.
3. Service code throws the caught exception back up to the perform( ) method of its Action class.
4. The perform( ) method catches the WPAException and returns a new WPABusinessErrorActionForward. The WPABusinessErrorActionForward constructor requires the WPAException cast as a BusinessException. In addition, it requires the HttpServletRequest, the key to the pathname of the page to be displayed to the user (that may be specified in configuration resource file 152 (FIG. 2)), and the ActionMapping.
5. The WPABusinessErrorActionForward will use the key to find the path. It also uses the ErrorInfoBean to store the error code for potential use in displaying to the user. The constructor also sets the success indicator and prompts data storage in the transaction classes for logging.
6. The page is created and displayed to the user.

The following use case describes a typical course of events for a situation in which a service needs to display a System error page as a result of a caught exception:
1. Service's action class is called, and code is executed in the perform( ) method.
2. Exception is thrown somewhere within the service's code, but it is something the service code cannot resolve on its own, therefore an error page must be displayed to the user.
3. Service code throws the caught exception back up to the perform( ) method of its Action class.
4. The perform( ) method catches the WPAException and returns a new WPASystemErrorActionForward, passing it the WPAException cast as a SystemException, the HttpServletRequest, and the ActionMapping.
5. The WPASystemErrorActionForward obtains the pathname to the error jsp page using the ActionMapping object in conjunction with a portal property that may be specified in configuration resource file 152 (FIG. 2). The name of the forward must be <portal>.error. Then, it uses the ErrorInfoBean to store the needed data for use in displaying info to the user. Currently, the data stored is the title key, UI message key, and error code. The exception is used to determine the error code, and a portion of the error code is used to determine the UI message key and title key for the message and title to be displayed.
6. The error page is created and displayed to the user.

The following use case describes a typical course of events for a situation in which a WPAFramework catches an exception that does not need to display an error page, but should be logged:
1. A WPAFramework class catches an instance of a concrete subclass of FrameworkException.
2. The WPAFramework class should throw the exception to the WPAController.
3. The WPAController catches the exception, then calls the Transaction object's logFrameworkException(FrameworkException method.
4. The logFrameworkException method logs the error data into the business activity manager and the error activity managers for output later into the log files.

The following use case describes a typical course of events for a situation in which a service needs to display a Business error page as a result of an exception in another application or process:
1. Service's action class is called, and code is executed in the perform( ) method.
2. Service interacts with another architecture.
3. Service gets a business error result from another architecture.
4. Service can't resolve the error and must display a page to the user—it creates a new WPABusinessErrorActionForward, passing it the error code of the business exception. In addition, the constructor requires the HttpServletRequest, the key to the pathname of the page to be displayed to the user (as stored in a configuration file 152 (FIG. 2)), and the ActionMapping.
5. The WPABusinessErrorActionForward will use the key to find the path. It also uses the ErrorInfoBean to store the error code for potential use in displaying to the user. The constructor also sets the success indicator and prompts data storage in the transaction classes for logging.
6. The page is created and displayed to the user.

The following use case describes a typical course of events for a situation in which a service needs to display a System error page as a result of an exception in another application or process:
1. Service's action class is called, and code is executed in the perform( ) method.
2. Service interacts with another architecture.
3. Service gets a system error result from another architecture.
4. Service can't resolve the error and must display a page to the user—it creates a new WPASystemErrorActionForward, passing it the error code of the system exception. In addition, the constructor requires the HttpServletRequest and the ActionMapping.
5. The WPASystemErrorActionForward obtains the pathname to the error JSP page using the ActionMapping object in conjunction with a portal property that may be specified in configuration resource file 152 (FIG. 2). The name of the forward must be <portal>.error. Then, it uses the ErrorInfoBean to store the error code. The title and message displayed to the user are looked up by portal and by error action forward and are the same for all service exceptions that occurred outside of the web presentation architecture, regardless of which outside architecture had the error.
6. The error page is created and displayed to the user.

Figure 4:
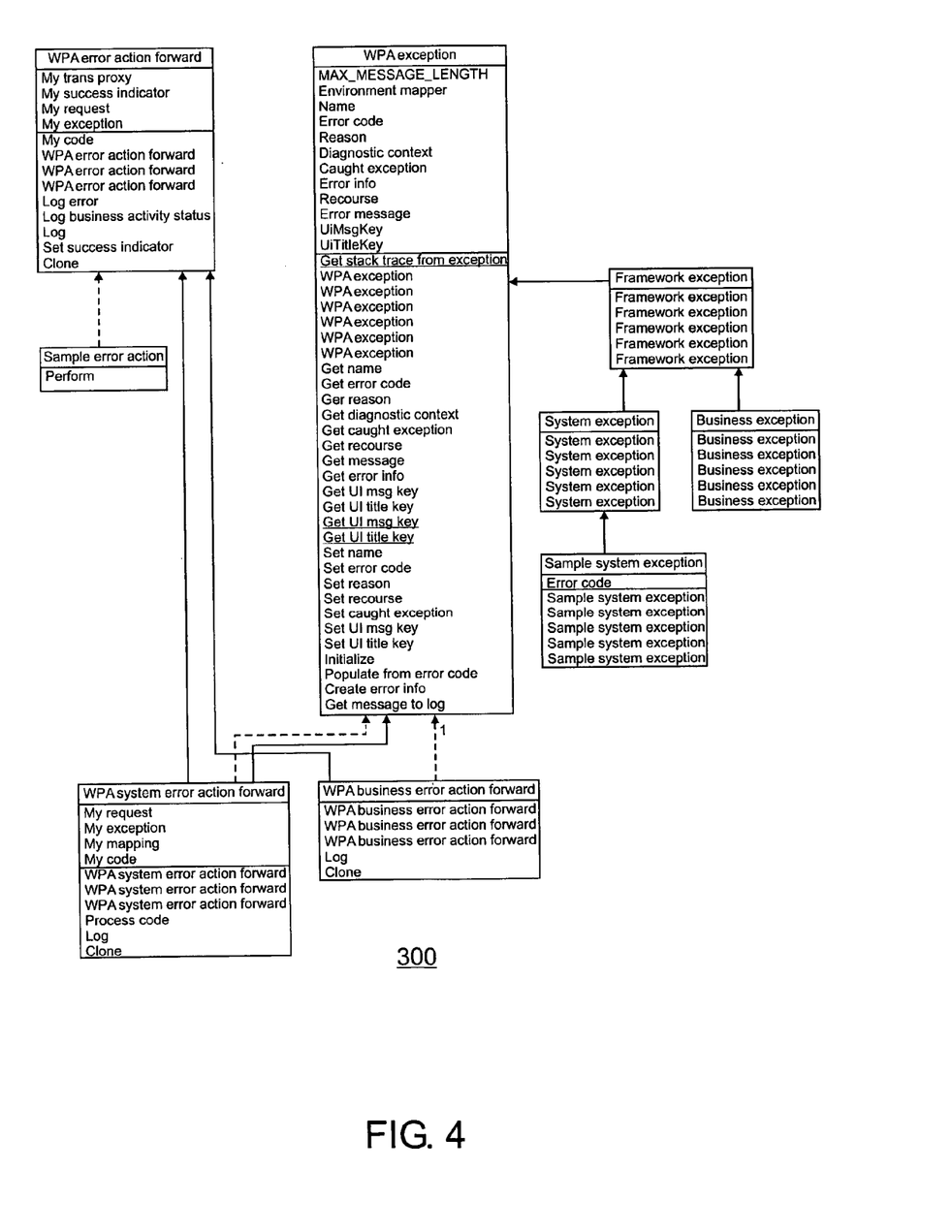
FIG. 4 is an object diagram of an architecture for object classes associated with error handling functionality in accordance with embodiments of the present invention.

FIG. 4 is an object diagram of an architecture for object classes associated with error handling functionality in accordance with embodiments of the present invention. The diagram is generally referred to by the reference numeral 300.

All the abstract exception classes may have constructors that include error codes. However, their concrete subclasses may not. This is because the error code may be hardcoded into the coding of the exception and is passed by the concrete exception to its superclass when it is created.

The developer of a web application in accordance with embodiments of the present invention may have several different options when creating a new exception. WPAException has constructors that allow subclasses to include an error message, diagnostic context, a caught exception, or some combination of those when creating themselves. If the exception is a concrete subclass of SystemException or FrameworkException, this extra data will be logged to the appropriate log file when a WPASystemErrorActionForward is created. Framework classes that want exceptions to be logged but that do not require an error page to be displayed to the user must manually call logFrameworkException (FrameworkException fe) method on the Transaction object. When a WPABusinessErrorActionForward is created, business activity status, caveat information, and error code information is recorded for later logging.

The caught exception may be a significant parameter that facilitates the use of error chaining. Developers may use the caught exception parameter when throwing a WPAException as a result of another exception. In this manner, a log entry of all the exceptions involved in the exception trail may be created. These entries may be stored in an error trace file.

Because WPAException is an abstract class, all constructors are called only by subclasses. Each concrete subclass has an errorCode value defined within it that is required for each superclass constructor. That code is used to look up data about the exception from the error catalog 210. The following constructors may be employed in conjunction with the WPAException class:

private WPAException( )—This forces one of the other constructors to be called, since the no arg constructor is private. At a minimum, each concrete subclass must provide an error code when calling the WPAException constructor.

public WPAException(String errorCode)—This constructor is called when there is no additional information other than that included in the error catalog that should be written to the error log file.

public WPAException(String errorCode, String errorMessage)—This is used when the programmer would like to log an additional message, perhaps to state exactly what occurred.

public WPAException(String errorCode, DiagnosticContext diagnosticContext)—Here, a diagnostic context object is added. The object should contain information about the context of the error, such as variable values, that can be used for debugging.

public WPAException(String errorCode, Exception caughtException)—This constructor is used when the WPAException is created as a result of another exception being caught. Using this constructor preserves the sequence of exceptions for possible output to the error trace log.

public WPAException(String errorCode, DiagnosticContext diagnosticContext, Exception caughtException)—When both a diagnostic context object and a caught exception are present, this constructor is called. It combines the added features of the previous two constructors.

public static String getStackTraceFromException(Exception e)—This method returns the stack trace of the exception as a string, so that it can be output or logged. This is a static method that is used in several classes.

various getter functions that return error name, error code, reason, diagnostic context, caught exception, recourse, errorInfo, UIMsgKey.

These allow other classes to access information about the exception. These are used for logging and error page display.

getErrorInfo( )—This method creates and returns an ErrorInfo object and should only be used when an exception is to be logged. In web presentation architectures in accordance with the present invention, SystemExceptions and FrameworkExceptions may be the only exceptions that are logged.

The FeatureException class is an abstract subclass of WPAException. Accordingly, the FeatureException class has the same types of constructors and may call super(<same parameters>) for each constructor. The following constructors may be used in conjunction with the FeatureException class:

private FeatureException( )—This forces one of the other constructors to be called, since the no arg constructor is private. At a minimum, each concrete subclass must provide an error code when calling the WPAException constructor.

public FeatureException(String errorCode)—This constructor is called when there is no additional information other than that included in the error catalog that should be written to the error log file.

public FeatureException(String errorCode, String errorMessage)—This is used when the programmer would like to log an additional message, perhaps to state exactly what occurred.

public FeatureException(String errorCode, DiagnosticContext diagnosticContext)—Here, a diagnostic context object is added. The object should contain information about the context of the error, such as variable values, that can be used for debugging.

public FeatureException(String errorCode, Exception caughtException)—This constructor is used when the WPAException is created as a result of another exception being caught. Using this constructor preserves the sequence of exceptions for possible output to the error trace log.

public FeatureException(String errorCode, DiagnosticContext diagnosticContext, Exception caughtException)—When both a diagnostic context object and a caught exception are present, this constructor is called. It combines the added features of the previous two constructors.

FrameworkException is the other abstract subclass of WPAException and has the same types of constructors as FeatureException. The FrameworkException class may employ constructors similar to those discussed with respect to the FeatureException class. Each concrete subclass of FrameworkException should have an error code defined within it, and each time a new instance of that exception is created, the error code is passed to the appropriate superclass constructor.

BusinessException is one of the two abstract subclasses of FeatureException. Services must subclass this class for all business exceptions. Each concrete subclass should have an error code defined within it, and each time a new instance of that exception is created, the error code is passed to the appropriate superclass constructor. Because the class is abstract, it may have constructors that have the same format as FrameworkException and FeatureException.

SystemException is the other abstract subclass of FeatureException. Accordingly the SystemException constructors may follow the same format as BusinessException, FrameworkException, and FeatureException.

Each concrete subclass of WPAException should define an error code that is passed to the appropriate superclass constructor. Developers of web applications in accordance with embodiments of the present invention may use the following constructors when creating new exceptions, where ConcreteException should be substituted with the actual name of the concrete exception:

public ConcreteException( )—This constructor is called when there is no additional information other than that included in the error catalog that should be written to the error log file public ConcreteException(String errorMessage)—This is used when the programmer would like to log an additional message, perhaps to state exactly what occurred.

public ConcreteException(DiagnosticContext diagnosticContext)—Here, a diagnostic context object is added. The object should contain information about the context of the error, such as variable values, that can be used for debugging.

public ConcreteException(Exception caughtException)—This constructor is used when the ConcreteException is created as a result of another exception being caught. Using this constructor preserves the sequence of exceptions for possible output to the error trace log.

public ConcreteException(DiagnosticContext diagnosticContext, Exception caughtException)—When both a diagnostic context object and a caught exception are present, this constructor is called. It combines the added features of the previous two constructors.

WPAErrorActionForward is an abstract superclass for action forwards that are created when a page must be displayed to a user due to some caught exception. The following constructors may be used in conjunction with the WPAErrorActionForward class:

public WPAErrorActionForward(WPAException wpae, HttpServletRequest request, String path)—The path parameter is the path to the page that should be displayed. It also obtains an instance to the TransactionProxy object.

public WPAErrorActionForward(String errorCode, HttpServletRequest request, String path)—The path parameter is the path to the page that should be displayed. This constructor is used for interactions with other architectures, where an error result is returned. It also obtains an instance to the TransactionProxy object.

protected void logError( )—This method calls the TransactionProxy's logError( ) method and stores the error data in the transaction for later logging.

protected void logBusinessActivityStatus( )—This method stores the error code and success indicator for use in logging to the business activity log file.

protected abstract void log( )—This method must be instantiated by a concrete subclass. It controls storing information for logging.

protected void setSuccesslndicator(int indicator)—This class is called by the subclasses to set the success indicator before the logBusinessActivityStatus( ) method is called.

public Object clone( )—This method returns a copy of this WPAErrorActionForward instance.

WPABusinessErrorActionForward is a class that may be used to display an error page to the user after a business exception. The following constructors may be employed in conjunction with the WPABusinessErrorActionForward class:

public WPABusinessErrorActionForward(BusinesSEXceP-tiOfl e, HttpServletRequest request, String resultClassName, ActionMapping mapping) - This constructor enables the business activity data to be extracted and logged. For this constructor, the WPAException must be a concrete instance of a BusinessException. The action mapping and the resultClassName are used to get the path of the page to be displayed.

public WPABusinessErrorActionForward(String businessErrorCode, HttpServletRequest request, String resultClassName, ActionMapping mapping)—This constructor is used for interactions with other architectures, where an error result is returned. This constructor enables the business activity data to be extracted and logged. For this constructor, the businessErrorCode is the error code of the business exception. The action mapping and the resultClassName are used to get the path of the page to be displayed.

private void process( )—This method extracts the data from the exception and stores it in the ErrorlnfoBean for possible access by JSP page. This method also calls the log method.

protected void log( )—This method controls storing information for logging.

public Object clone( )—This method returns a copy of this WPABusinessErrorActionForward instance.

An instance of a WPASystemErrorActionForward may be created when an error page should be displayed to a user because of an instance of a concrete subclass of SystemException or FrameworkException. The following constructors may be employed in conjunction with the WPASystemErrorActionForward class:

public WPASystemErrorActionForward(SystemException wpae, HttpServletRequest request, ActionMapping mapping)—This constructor enables the error data to be extracted and logged. For this constructor, the WPAException must be a concrete instance of a SystemException. The ActionMapping object may be used in conjunction with a portal property specified in configuration resource file 152 (FIG. 2) to get the path of the error page to be displayed.

public WPASystemErrorActionForward(FrameworkException wpae, HttpServletRequest request, ActionMapping mapping)—This constructor enables the error data to be extracted and logged. For this constructor, the WPAException must be a concrete instance of a FrameworkException. The ActionMapping object may be used in conjunction with a portal property specified in configuration resource file 152 (FIG. 2 ) to get the path of the error page to be displayed.

public WPASystemErrorActionForward(String systemErrorCode, HttpServletRequest request, ActionMapping mapping)—This constructor is used for interactions with other architectures, where an error result is returned. This constructor enables the error data to be extracted and logged. For this constructor, the systemErrorCode is the error code of the system exception. The ActionMapping object may be used in conjunction with a portal property specified in configuration resource file 152 (FIG. 2 ) to get the path of the error page to be displayed.

private void processException( )—This method extracts the data from the exception and stores it in the ErrorlnfoBean for display to the user. This method also calls the log method.

private void processCode( )—This method stores the error code in the ErrorlnfoBean for display to the user. This method also calls the log method. protected void log( )—This method controls storing information for logging.

public Object clone( )—This method returns a copy of this WPASystemErrorActionForward instance.

The WPASystemErrorActionForward may use the ErrorlnfoBean object to store values that are later accessed by the error JSP page for display. There may be getter and setter methods for error code, UI message key, and title key.

The following discussion relates to the design of the error catalog 210 (FIG. 3). The error catalog 210 may provide exceptions with a centralized object that may be used to look up information by error code. Each service that creates its own concrete subclasses of SystemException must have an errorCode.properties file stored in an appropriate predetermined directory to define per SystemException error code the error name, error reason, and error recourse. Concrete subclasses of FrameworkException must also have similar error data recorded in an errorCode.properties file, but because those exceptions are created within the framework of a web presentation architecture constructed in accordance with embodiments of the present invention, they reside in the framework's errorCode.properties file. The numerical portion of the error codes should fall within a range that defines a general description of the error. The ranges may also indicate a title key and UI message key that should be used with each error when displaying an error page to the user. In addition, the type of error action forward may indicate a title key and UI message key that should be used in certain occasions when displaying an error page to a user. This information may be portal specific and portal information that may be stored in the a configuration file such as the configuration file 212 (FIG. 3) may be used in conjunction with the error action forward name to indicate title keys and UI message keys.

As set forth above, the error catalog 210 may be populated when the controller 205 (FIG. 3) starts up (e.g. in the init( ) function of the controller 205). An ErrorCodeConfigurator may be among the configurators called during startup, and it may search for and open a configuration file for each service. Those of ordinary skill in the art will appreciate that a single configuration file may be used for storing information about all relevant services, if desired. The configuration file or files may be text properties files or the like. The properties are read and stored into an ErrorCodeMapper, then loaded into the ErrorCodeCatalog as ErrorCode objects or title and UI message data.

The functionality associated with the error catalog 210 (FIG. 3) may comprise a plurality of classes, which may be referred to as "actors." Those actors may include the following:

WPAController—the controller (for example, the controller 205 (FIG. 3)).

WPAConfiguratorController—the controller class that calls all the configurators, given the list as defined in a predetermined configuration file.

ErrorCodeConfigurator—the configurator run during the controller initialization that opens the errorCode.properties file for each service.

ErrorCodeMapper—where the data from the errorCode.properties files of the services are stored.

Catalog—the abstract superclass of ErrorCodeCatalog.

ErrorCodeCatalog—this object stores ErrorCode objects, searchable by error codes. This object also stores title key and UI message key data.

ErrorCode—this object stores data about each exception: the error code, error name, error reason, and error recourse.

The following use case describes a typical course of events for a situation in which error data is loaded upon controller initialization:

1. During startup, the init( ) method of the controller makes the proper calls so the configurator classes are run (using the WPAConfiguratorController).

2. Among the configurator classes run is ErrorCodeConfigurator.

3. ErrorCodeConfigurator.configure( ) is called. This method uses the passed in ActionServlet parameter to obtain a servletContext. The servletContext is used to traverse the directory tree to find each service's errorCode.properties file.

4. Once found, the errorCode.properties file of each service is opened and the data is loaded into the singleton ErrorCodeMapper object.

5. ErrorCodeConfigurator then calls the configure( ) method of ErrorCodeCatalog.

6. For each property in the mapper, the catalog calls registerHandler, a method inherited from its superclass, Catalog. The registerHandler method creates an ErrorCode object for each entry that was an errorCode mapping in the properties file. These entries are then stored by error code in the "handlers" hashtable of the ErrorCodeCatalog. Additionally, the method isolates the uiMessage entries and stores them separately in a "uiMessages" hashtable the ErrorCodeCatalog.

The configuration file that is loaded by the controller at initialization may comprise three types of data: UI message key data, title key data and mapping data. The UI message key data may be defined as follows:

<range>.<portal_name>=<UI_Msg_key> or

<actionForwardName>.<portal_name>=<UI_Msg_key> where the range may take into account the numbering guidelines:

| | |
|---|---|
| System unavailable | 10000 to 10999 |
| Service unavailable | 15000 to 15999 |
| Database related errors | 20000 to 20999 |
| File System errors | 25000 to 25999 |
| Service errors | 30000 to 30999 | and where UI_Msg_key comprises: <portal_name>.error.<description_of_string> and where actionForwardName comprises the fuliy qualified pathname for one of WPASystemErrorActionForward or WPABusinessErrorActionForward.

An example set of UI message definitions follows:

```
10000–10999.example=example.error.system_unavail_msg
15000–15999.example=example.error.service_unavail_msg
20000–20999.example=example.error.db_err_msg
25000–25999.example=example.error.file_sys_err_msg
30000–30999.example=example.error.service_err_msg
com.samplePath.WPASystemErrorActionForward.example=
example.error.service_unavail_msg
com.samplePath.WPASystemErrorActionForward.example=
example.error.service_unavail_msg
```

Title keys that are stored in configuration files may be defined according to the following format:

<range>.title.<portal—name>=<Title—Msg—key> or

<actionForwardName>.title.<portal—name>=<Title—Msg—key> where the range takes into account the numbering guidelines described above and where Title_Msg_key may comprise: <portal_name>.error.<description_of_string> (i.e. example.error.service_err_pg_title), and where actionForwardName comprises the fully qualified pathname for one of WPASystemErrorActionForward or WPABusinessErrorActionForward.

An example follows:

```
10000–10999.title.example=example.error.system_unavail_pg_title
15000–15999.title.example=example.error.service_unavail_pg_title
20000–20999.title.example=example.error.db_err_pg_title
25000–25999.title.example=example.error.file_sys_err_pg_title
30000–30999.title.example=example.error.service_err_pg_title
com.samplePath.WPASystemErrorActionForward.title.example=
    example.error.service_unavail_pg_title
com.samplePath.WPASystemErrorActionForward.title.example=
    example.error.service_unavail_pg_title
```

The third type of data in the errorCode.properties file is the mapping of error code to error name, error reason, and error recourse. An exemplary format for that mapping follows:

errorCode=errorName1|errorReason1|Recourse where the error code follows the format:

<portal>-p1-<service>-errorCode

An exemplary StartupException follows: sampleFramework-p1-sampleFramework-10999=StartupClassInitializationError|Error occurred during initializing startup classes at weblogic startup|Check startup_error.log file for any errors logged.

Figure 5:
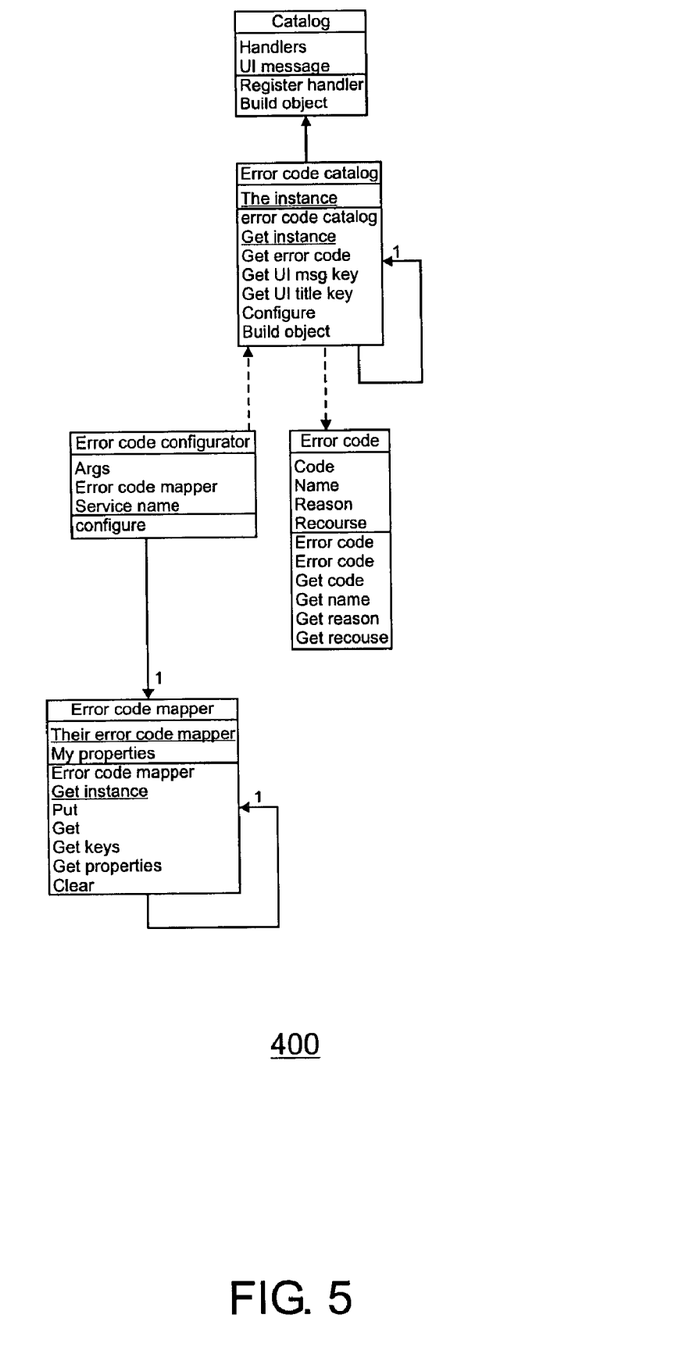
FIG. 5 is an object diagram of an architecture for object classes associated with an error catalog in accordance with embodiments of the present invention.

FIG. 5 is an object diagram of an architecture for object classes associated with an error catalog in accordance with embodiments of the present invention. The diagram is generally referred to by the reference numeral 400.

The ErrorCodeConfigurator class may implement the configure(ActionServlet) method defined in the Configurator interface. The ActionServlet parameter is used to locate and open the errorCode.properties files in the directory tree. The following method may be employed in conjunction with the ErrorCodeConfigurator class:

public void configure(ActionServlet servlet).

The ErrorCodeMapper class may store all the properties defined in the various service defined errorCode.properties files. It is a singleton object, and therefore can be called when the ErrorCodeCatalog is being configured. A singleton object is an object that exists in memory such that only one of that type of object exists at any time in memory. Once created, a singleton object is not destroyed after use, like most objects, but is kept in memory until accessed again. The following method may be employed in conjunction with the ErrorCodeMapper class:

public static ErrorCodeMapper getInstance( )—Returns the instance of the ErrorCodeMapper.

The Catalog class is an abstract superclass of ErrorCodeCatalog. The registerHandler method that ErrorCodeCatalog inherits creates the ErrorCode objects from the data in the ErrorCodeMapper and stores them in a "handlers" hashtable. The title keys and UI message keys are also isolated and stored in a "uiMessages" hash table. If there is a problem encountered during this method, the FrameworkException RegisterHandleException is thrown. The following method may be employed in conjunction with the Catalog class:

public synchronized void registerHandler(String code, String value) throws RegisterHandleException.

The ErrorCodeCatalog class is a concrete subclass of Catalog that creates an error catalog in its configure( ) method. For each entry stored in the ErrorCodeMapper, registerHandler( ) is called, and either an ErrorCode object is created, or the entry is recognized as a title key or UI message key entry. ErrorCode objects are stored in a hash table separate from the title and UI message hash table. The following methods may be employed in conjunction with the ErrorCodeCatalog class:

public synchronized static ErrorCodeCatalog getInstance( )—ErrorCodeCatalog is a singleton object, so programmers may access it through its getInstance( ) method.

public void configure( )—Creates the error catalog by accessing the ErrorCodeMapper and creating ErrorCode objects or storing title keys and UI message keys.

The ErrorCode object holds information about an exception, as loaded from the errorCode.properties file, including error code, error name, error reason, and error recourse. In addition to the constructor, there are getter functions for each of the fields just named. The following constructor may be employed in conjunction with the ErrorCode object:

public ErrorCode(String code,String name,String reason, String recourse).

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system, comprising:
   a controller generator that is adapted to provide an application with a controller that receives a request for data from a user and responds to the request for data by sending information to the user; and
   an error handler generator that is adapted to provide an error handler that performs error handling functionality for the application based on error data that is stored in an error catalog if an error occurs during the processing of the request for data, wherein the error handler is adapted to categorize exceptions into a FeatureException class or a FrameworkException class.

2. The system set forth in claim 1, wherein the controller is adapted to read the error data from a configuration file.

3. The system set forth in claim 2, wherein the configuration file is a text properties configuration file.

4. The system set forth in claim 1, wherein the error data comprises user interface ("UI") message key data, title key data and mapping data.

5. The system set forth in claim 1, wherein the FeatureException class comprises a BusinessException class and a SystemException class.

6. The system set forth in claim 1, wherein the error catalog contains error data that is specific to each of a plurality of portals.

7. The system set forth in claim 1, wherein the error handler is adapted to chain error information if an exception generates a subsequent exception.

8. A method, comprising:
   creating, with a processor-based device, a controller that is adapted to receive a request for data from a user and respond to the request;

providing an error handler that performs error handling functionality based on error data that is stored in an error catalog if an error occurs during the processing of the request for data; and adapting the error handler to categorize exceptions into a FeatureException class or a FrameworkException class.

9. The method set forth in claim 8, comprising adapting the controller to read the error data from a configuration file.

10. The method set forth in claim 9, comprising defining the configuration file to be a text properties configuration file.

11. The method set forth in claim 8, comprising defining the error data to comprise user interface ("UI") message key data, title key data and mapping data.

12. The method set forth in claim 8, comprising defining the FeatureException class to comprise a BusinessException class and a SystemException class.

13. The method set forth in claim 8, comprising adapting the error catalog to contain error data that is specific to each of a plurality of portals.

14. The method set forth in claim 8, comprising adapting the error handler to chain error information if an exception generates a subsequent exception.

15. A system for creating web applications, the system comprising:

means for creating a controller that is adapted to receive a request for data from a user and respond to the request; and means for creating an error handler that performs error handling functionality based on error data that is stored in an error catalog if an error occurs during the processing of the request for data, wherein the error handler is adapted to categorize exceptions into a FeatureException class or a FrameworkException class.

16. The system set forth in claim 15, wherein the controller is adapted to read the error data from a configuration file.

17. The system set forth in claim 16, wherein the configuration file is a text properties configuration file.

18. The system set forth in claim 15, wherein the error data comprises user interface ("UI") message key data, title key data and mapping data.

19. The system set forth in claim 15 wherein the FeatureException class comprises a BusinessException class and a SystemException class.

20. The system set forth in claim 15, wherein the error catalog contains error data that is specific to each of a plurality of portals.

21. The system set forth in claim 15, wherein the error handler is adapted to chain error information if an exception generates a subsequent exception.

22. A program, comprising:

a machine readable medium;

a controller generator stored on the machine readable medium, the controller generator being adapted to provide an application with a controller that receives a request for data from a user and responds to the request by sending information to the user; and an error handler generator stored on the machine readable medium, the error handler generator being adapted to provide an error handler that performs error handling functionality during operation of the application if an error occurs during the processing of the request for data based on error data that is stored in an error catalog, wherein the error handler is adapted to categorize exceptions into a FeatureException class or a FrameworkException class.

23. The program set forth in claim 22, wherein the controller is adapted to read the error data from a configuration file.

24. The program set forth in claim 22, wherein the configuration file is a text properties configuration file.

25. The program set forth in claim 22, wherein the error data comprises user interface ("UI") message key data, title key data and mapping data.

* * * * *

UNITED STATES PATENT AND TRADEMARK OFFICE
CERTIFICATE OF CORRECTION

| | | |
|---|---|---|
| PATENT NO. | : 7,146,544 B2 | Page 1 of 1 |
| APPLICATION NO. | : 10/676218 | |
| DATED | : December 5, 2006 | |
| INVENTOR(S) | : Christina Hsu et al. | |

It is certified that error appears in the above-identified patent and that said Letters Patent is hereby corrected as shown below:

In column 15, lines 63-64, delete "(BusinesSEXceptiOfl e" and insert -- (BusinessException e --, therefor.

In column 18, line 4, delete "ActionServiet" and insert -- ActionServlet --, therefor.

Signed and Sealed this

Seventeenth Day of November, 2009

David J. Kappos
*Director of the United States Patent and Trademark Office*